(12) United States Patent
Kang et al.

(10) Patent No.: US 11,699,552 B2
(45) Date of Patent: Jul. 11, 2023

(54) MULTILAYER CERAMIC ELECTRONIC COMPONENT

(71) Applicant: SAMSUNG ELECTRO-MECHANICS CO., LTD., Suwon-si (KR)

(72) Inventors: Suji Kang, Suwon-si (KR); Dongjin Kim, Suwon-si (KR); Jinkyung Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 51 days.

(21) Appl. No.: 17/562,383

(22) Filed: Dec. 27, 2021

(65) Prior Publication Data

US 2022/0208453 A1 Jun. 30, 2022

(30) Foreign Application Priority Data

Dec. 31, 2020 (KR) .......................... 10-2020-0189537
Dec. 10, 2021 (KR) .......................... 10-2021-0176745

(51) Int. Cl.
*H01G 4/12* (2006.01)
*H01G 4/012* (2006.01)
*H01G 4/30* (2006.01)

(52) U.S. Cl.
CPC ............ *H01G 4/1218* (2013.01); *H01G 4/012* (2013.01); *H01G 4/30* (2013.01)

(58) Field of Classification Search
CPC ...... H01G 4/1218; H01G 4/012; H01G 2/065; H01G 4/005; H01G 4/1272; H01G 4/228;

(Continued)

(56) References Cited

U.S. PATENT DOCUMENTS

2002/0149901 A1 10/2002 Shindo et al.
2006/0264317 A1* 11/2006 Banno .................. B32B 18/00
501/138

(Continued)

FOREIGN PATENT DOCUMENTS

JP  2002-260951 A   9/2002
JP  2007-258475 A  10/2007

(Continued)

OTHER PUBLICATIONS

Anton B. Polotai et al., "Effect of Cr additions on the microstructural stability of Ni electrodes in ultra-thin BaTiO3 multilayer capacitors", J. Electroceram (2007) 18:261-268.

(Continued)

*Primary Examiner* — Michael P McFadden
(74) *Attorney, Agent, or Firm* — Morgan, Lewis & Bockius LLP

(57) ABSTRACT

A multilayer ceramic electronic component includes: a ceramic body including a dielectric layer containing strontium (Sr) and first and second internal electrodes alternately stacked with the dielectric layer interposed therebetween; and a first external electrode and a second external electrode connected to the first and second internal electrode, respectively, in which the dielectric layer includes a first region parallel to and adjacent to the first internal electrode or the second internal electrode and having a thickness of 50 nm or less, and a second region parallel to and adjacent to the first region, and the first region has an average content of strontium (Sr) greater than 0.1 mol % and less than 9.3 mol %, and the second region has a lower average content of strontium (Sr) than that of the strontium of the first region.

11 Claims, 6 Drawing Sheets

(58) Field of Classification Search
CPC ........ H01G 4/232; H01G 4/1227; H01G 4/30; H01G 4/224; H01G 4/1209
See application file for complete search history.

(56) References Cited

U.S. PATENT DOCUMENTS

| | | | | |
|---|---|---|---|---|
| 2010/0014210 A1* | 1/2010 | Nakamura | ............ | H01G 4/1227 252/62.3 BT |
| 2013/0294008 A1 | 11/2013 | Kim et al. | | |
| 2014/0301015 A1* | 10/2014 | Kim | ............ | H01G 4/12 29/25.03 |
| 2015/0036264 A1* | 2/2015 | Morita | ............ | C04B 35/4682 361/321.4 |
| 2015/0114701 A1* | 4/2015 | Chung | ............ | H01G 4/224 361/321.2 |
| 2015/0318109 A1* | 11/2015 | Lee | ............ | H01G 4/0085 156/89.16 |
| 2015/0348712 A1* | 12/2015 | Lee | ............ | H01G 4/30 156/89.12 |
| 2016/0314900 A1 | 10/2016 | Sin et al. | | |
| 2019/0241476 A1* | 8/2019 | Nomura | ............ | C04B 35/62625 |

FOREIGN PATENT DOCUMENTS

| | | |
|---|---|---|
| KR | 10-2013-0124068 A | 11/2013 |
| KR | 10-1681413 B1 | 11/2016 |

OTHER PUBLICATIONS

Jeong-Oh Hong et al., "Development History and Trend of High-Capacitance Multi-layer Ceramic Capacitor in Korea", Journal of the Korean Ceramic Society. vol. 46, No. 2, pp. 161-169, 2009, with English Abstract.

Noor Jawad Ridha et al., "Effect of Sr Substitution on Structure and Thermal Diffusivity of Ba1-xSrxTiO3 Ceramic", American J. of Engineering and Applied Sciences 2(4): 661-664, 2009.

Xiaorong Cheng et al., "Enhanced spontaneous polarization in Sr and Ca co-doped BaTiO3 ceramics", Solid State Communications 141 (2007) 587-590.

* cited by examiner

MULTILAYER CERAMIC ELECTRONIC COMPONENT

CROSS-REFERENCE TO RELATED APPLICATION(S)

This application claims benefit of priority to Korean Patent Applications Nos. 10-2020-0189537 filed on Dec. 31, 2020 and 10-2021-0176745 filed on Dec. 10, 2021 in the Korean Intellectual Property Office, the disclosures of which are incorporated herein by reference in its entirety.

BACKGROUND

1. Field

The present disclosure relates to a multilayer ceramic electronic component.

2. Description of Related Art

In accordance with a recent trend for the miniaturization of electronic products, multilayer ceramic electronic components have also been required to be miniaturized and to have high capacitance. Dielectric sheets of multilayer ceramic electronic components are also becoming thinner to meet the demand for miniaturization and high capacitance of multilayer ceramic electronic components.

These internal electrodes include a conductive metal, but there is a difference in shrinkage behaviors when the metal and dielectric layers constituting the internal electrodes are sintered. The difference in shrinkage behaviors between the internal electrode and the dielectric layer generates stress between the internal electrode and the dielectric layer, thereby deteriorating the connectivity of the internal electrode. In particular, when the thinned internal electrode is applied, this problem may be bound to have a greater impact.

In order to alleviate this problem, a method of delaying a shrinkage start temperature of an internal electrode by adding a common ceramic material to an internal electrode paste has been used. However, the method of adding the common ceramic material has the effect of delaying shrinkage by the common ceramic material remaining in the internal electrode until secondary plasticizing, but has a problem of decreasing the density of the internal electrode as the common ceramic material is squeezed-out to the dielectric layer after 700 É. In addition, as the temperature increases, particles in the electrode may be locally balled to lower surface energy, and the connectivity of the internal electrodes may decrease due to this electrode balling, and when the common ceramic material component is squeezed-out to the dielectric layer, the common ceramic material may promote growth of grains in a dielectric substance, which may lead to increase a size and dispersion of grains.

SUMMARY

An aspect of the present disclosure may provide a multilayer ceramic electronic component of which connectivity of internal electrodes is improved.

Another aspect of the present disclosure may provide a multilayer ceramic electronic component of which a size and dispersion of grains are constantly adjusted.

Another aspect of the present disclosure may provide a multilayer ceramic electronic component of which insulation resistance characteristics are improved.

Another aspect of the present disclosure may provide a multilayer ceramic electronic component in which reliability is improved.

According to an aspect of the present disclosure, a multilayer ceramic electronic component may include: a ceramic body including a dielectric layer containing strontium (Sr) and first and second internal electrodes alternately stacked with the dielectric layer interposed therebetween; a first external electrode connected to the first internal electrode; and a second external electrode connected to the second internal electrode, in which the dielectric layer includes at least one first region parallel to and adjacent to the first internal electrode or the second internal electrode and has a thickness of 50 nm or less, and at least one second region parallel to and adjacent to the first region, and the first region has an average content of strontium (Sr) greater than 0.1 mol % and less than 9.3 mol % with respect to a total content of the compounds included in the first region, and the second region has a lower average content of strontium (Sr) than that of the strontium of the first region.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
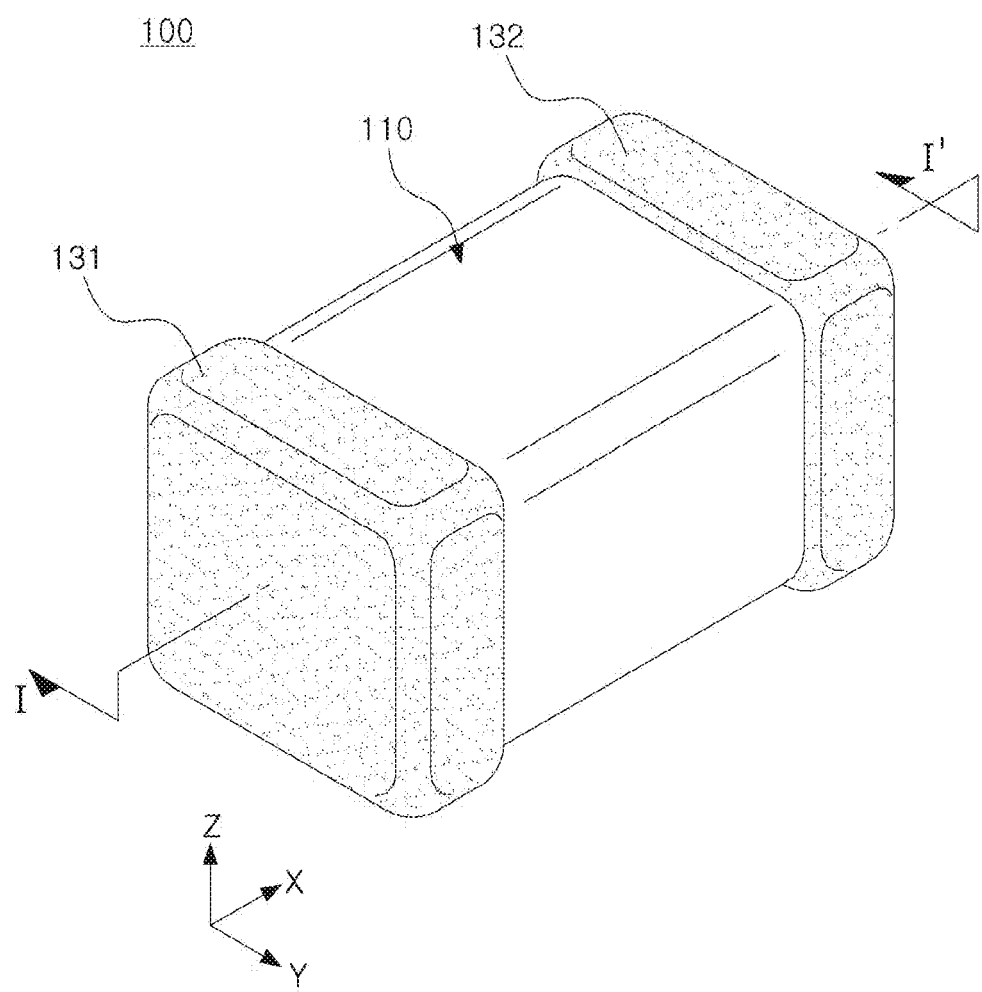
FIG. 1 is a perspective view schematically illustrating a multilayer ceramic electronic component according to an exemplary embodiment in the present disclosure.

Hereinafter, exemplary embodiments of the present disclosure will now be described in detail with reference to the accompanying drawings.

In the drawings, an X direction refers to a first direction, an L direction, or a length direction, a Y direction refers to a second direction, a W direction, or a width direction, and a Z direction refers to a third direction, a T direction, or a thickness direction.

Figure 2:
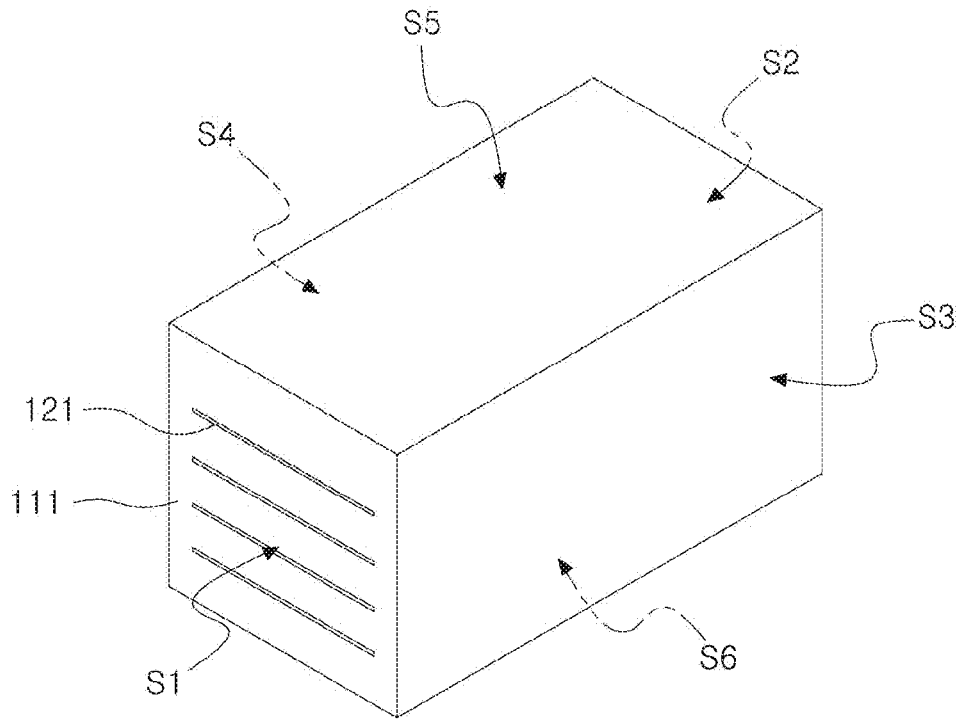
FIG. 2 is a schematic perspective view illustrating a ceramic body of FIG. 1.
Figure 3:
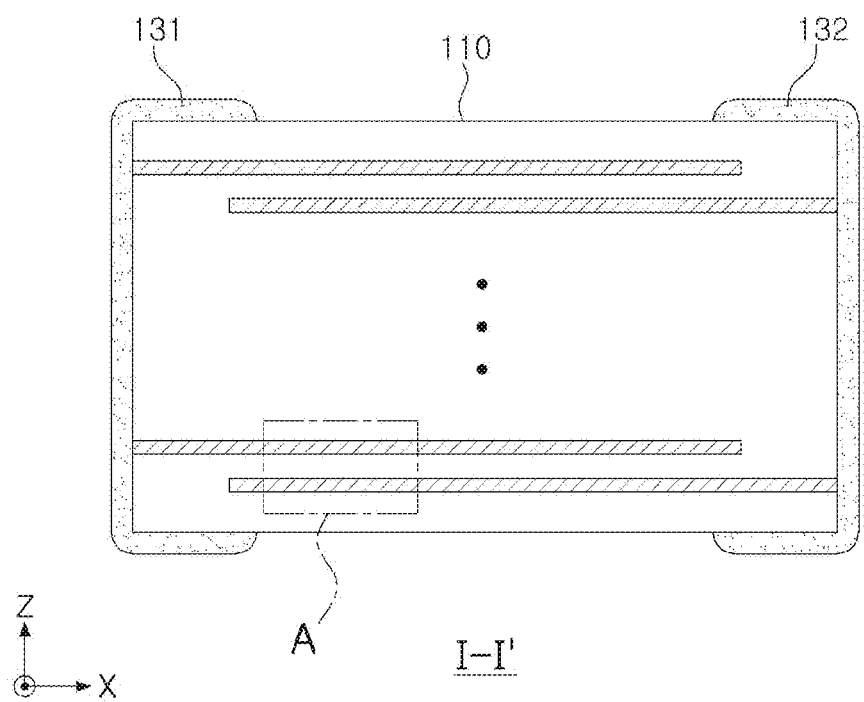
FIG. 3 is a cross-sectional view taken along line I-I' of FIG. 1.
Figure 4:
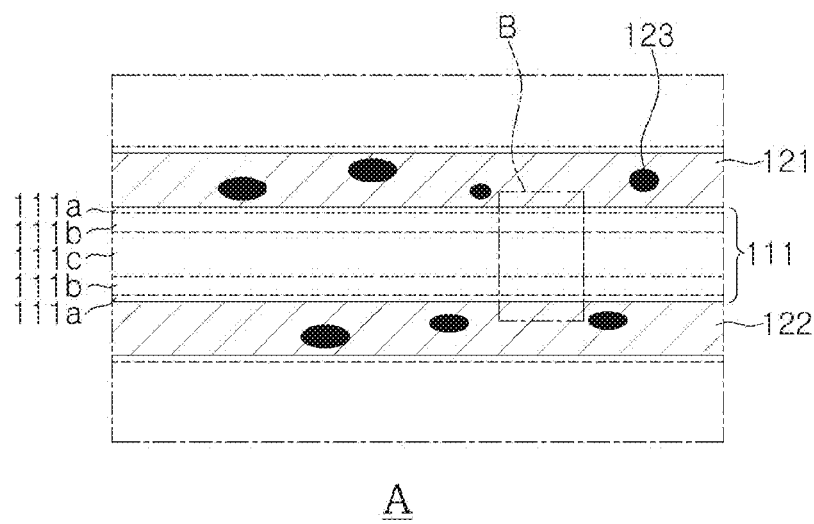
FIG. 4 is an enlarged view of region A of FIG. 3.
Figure 5:
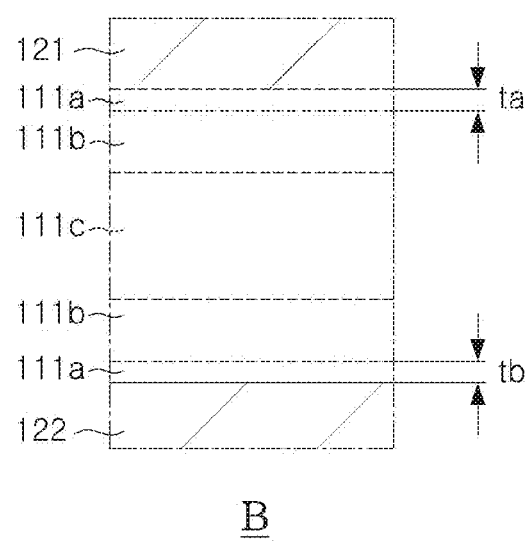
FIG. 5 is an enlarged view of region B of FIG. 4.

FIG. 1 is a perspective view schematically illustrating a multilayer ceramic electronic component according to an exemplary embodiment in the present disclosure, FIG. 2 is a perspective view illustrating a multilayer ceramic electronic component of FIG. 1, and FIG. 3 is a cross-sectional view taken along line I-I' of FIG. 1. FIG. 4 is an enlarged view of region A of FIG. 3, and FIG. 5 is an enlarged view of region B of FIG. 4.

Hereinafter, a multilayer ceramic electronic component according to an exemplary embodiment in the present disclosure will be described with reference to FIGS. 1 to 5.

Referring to FIGS. 1 to 5, a multilayer ceramic electronic component 100 according to an exemplary embodiment in the present disclosure may include: a ceramic body 110 including a dielectric layer 111 containing strontium (Sr) and a first internal electrode 121 and a second internal electrode 122 disposed to face each other, having the dielectric layer 111 disposed therebetween; a first external electrode 131 connected to the first internal electrode 121; and a second external electrode 132 connected to the second internal electrode 122, in which the dielectric layer may include at least one first region parallel to and adjacent to the first internal electrode or the second internal electrode and having a thickness of 50 nm or less, and at least one second region parallel to and adjacent to the first region, the first region may have an average content of strontium (Sr) greater than 0.1 mol % and less than 9.3 mol % with respect to a total content of the compounds included in the first region, and the second region may have a lower average content of strontium (Sr) than that of the strontium of the first region.

Generally, when forming an internal electrode having a thin thickness, a common ceramic material may be added. This is to suppress the occurrence of breakage in the sintering process because the conductive metal forming the internal electrode has a different shrinkage start temperature from the ceramic material forming the dielectric layer. The common ceramic material is discharged to the outside due to the shrinkage of metal of the internal electrode and is absorbed by the dielectric layer during the sintering process.

In most multilayer ceramic electronic components, barium titanate ($BaTiO_3$), which is the same as the dielectric layer, is used as the common ceramic material. However, as the thicknesses of the internal electrode and the dielectric layer of the multilayer ceramic electronic component decrease, the size of the common ceramic material also decreases in order to effectively prevent contact between metal particles. However, small-sized barium titanate ($BaTiO_3$) particles may have lower crystallinity than that of a dielectric substance, and thus a large amount of oxygen vacancy may be generated near an interface of the internal electrode due to a ceramic material component discharged from the internal electrode, which may adversely affect properties and reliability of the dielectric substance. In addition, the sintering of the barium titanate ($BaTiO_3$) particles in the dielectric substance may be promoted, and thus the size of grains may increase near the interface between the dielectric layer and the internal electrode, and dispersion may be deteriorated, thereby reducing the reliability.

The multilayer ceramic electronic component 100 according to the present disclosure may solve the above problems. In the multilayer ceramic electronic component 100 according to the present disclosure, the dielectric layer 111 may include strontium (Sr), a first region 111a having the highest content of strontium (Sr) in the dielectric layer 111 may be parallel to and adjacent to the first internal electrode 121 and/or the second internal electrode 122 and have a thickness of 50 nm of less, and a second region having a lower average content of strontium (Sr) than the first region may be parallel to and adjacent to the first region, thereby reducing the discharge of the common ceramic material and suppressing the generation of the oxygen vacancy. In the present specification, the "oxygen vacancy" refers to a vacant place generated due to the escape of oxygen from a place where oxygen should present in a certain form of a compound. For example, when barium titanate ($BaTiO_3$) having a perovskite structure ($ABO_3$) is sintered in a reducing atmosphere, some oxygen atoms contained in the barium titanate ($BaTiO_3$) is reduced, and thus, the oxygen escapes from the barium titanate ($BaTiO_3$). In this case, the vacant place from which the oxygen escapes becomes an oxygen vacancy with ion conductivity. Since such oxygen vacancy is a cause of decreasing electrical properties such as a decrease in insulation, it is important to suppress a generation of oxygen vacancy in a multilayer ceramic electronic component having a thin thickness. In the multilayer ceramic electronic component 100 according to the present disclosure, the first region 111a of the dielectric layer 111 is parallel to and adjacent to the first internal electrode 121 and/or the second internal electrode 122, and thus the generation of the oxygen vacancy may be effectively suppressed.

The multilayer ceramic electronic component 100 according to the exemplary embodiment in the present disclosure may include the ceramic body 110 that includes the dielectric layer 111 and the first and second internal electrodes 121 and 122 alternately stacked with the dielectric layer 111 interposed therebetween.

The ceramic body 110 has first and second surfaces S1 and S2 facing each other in a first direction (X direction), third and fourth surfaces S3 and S4 facing each other in a second direction (Y direction), and fifth and sixth surfaces S5 and S6 facing each other in a third direction (Z direction).

A shape of the ceramic body 110 is not particularly limited, but may be a hexahedral shape or a shape similar to the hexahedral shape as illustrated. Although the ceramic body 110 does not have a hexahedral shape having a perfect straight line due to shrinkage of ceramic powder particles included in the ceramic body 110 in the sintering process, the ceramic body 110 may have substantially the hexahedral shape. If necessary, the ceramic body 110 may be rounded so that edges are not angled. The round treatment may use, for example, barrel polishing or the like, but is not limited thereto.

The dielectric layer 111, the first internal electrode 121, and the second internal electrode 122 may be alternately stacked in the ceramic body 110. The dielectric layer 111, the first internal electrode 121, and the second internal electrode 122 may be stacked in a third direction (Z direction). The dielectric layers 111 may be in a sintered state, and adjacent dielectric layers 111 may be integrated with each other so that boundaries therebetween are not readily apparent without using a scanning electron microscope (SEM).

The dielectric layer 111 of the multilayer ceramic electronic component 100 according to the present disclosure may include a component represented by $(Ba_{1-x}Ca_x)(Ti_{1-y}(Zr, Sn, Hf)_y)O_3$ (wherein, $0 \leq x \leq 1$, $0 \leq y \leq 0.5$). The component may include, for example, a chemical compound in which Ca, Zr, Sn and/or Hf is partially dissolved in $BaTiO_3$. In the above composition formula, x may be in the range of 0 or more and 1 or less, and y may be in the range of 0 or more and 0.5 or less, but is not limited thereto. For example, in the above composition formula, when x is 0, and y is 0, the component may be $BaTiO_3$. In addition, various ceramic additives, organic solvents, plasticizers, binders, dispersants, and the like, may be added to the component according to an object of the present disclosure.

In an example of the present disclosure, the dielectric layer 111 of the multilayer ceramic electronic component 100 of the present disclosure may include strontium (Sr). The average content of strontium (Sr) in the dielectric layer 111 may be the highest in the first region 111a, and the dielectric layer 111 other than the first region 111a may also contain strontium (Sr). In the present disclosure, the "average content" of strontium (Sr) in the dielectric layer 111 may mean an arithmetic mean of the content of strontium (Sr) in the dielectric layer 111 collected from 10 locations, and may be a value measured at 10 locations at equal intervals in the third direction from an XZ cut plane passing through a center of the ceramic body 110 of the multilayer ceramic electronic component 100 according to the present disclosure.

Figure 6:
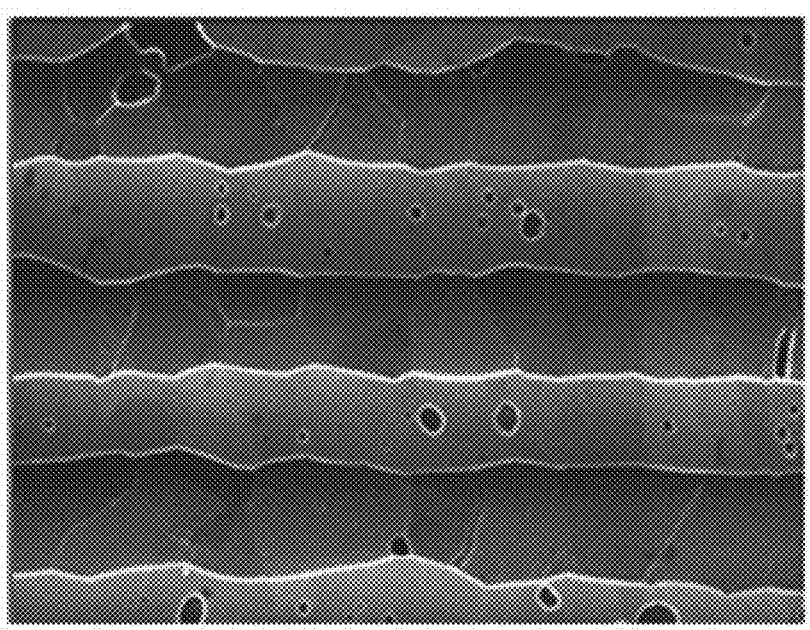
FIG. 6 is an image, captured by an SEM, of a cross section of the multilayer ceramic electronic component according to Inventive Example.

In one example of the present disclosure, the average content of strontium (Sr) in the dielectric layer 111 of the multilayer ceramic electronic component 100 may decrease as the distance from the interface between the dielectric layer 111 and the first internal electrode 121 and/or the second internal electrode 122 increases. In the present specification, the "interface" between the dielectric layer 111 and the first internal electrode 121 and/or the second internal electrode 122 may mean a surface with which the dielectric layer and the internal electrode are in contact, and may mean a surface that may be observed through an SEM image or the like. For example, as illustrated in FIG. 6, the internal electrode may be formed in a single layer structure, and the dielectric layer may be formed in a structure including a plurality of grains. In FIG. 6, a white region in which grain boundaries disposed between grains are not connected and breaks off may be an interface between the dielectric layer and the internal electrode. The average content of strontium (Sr) in the dielectric layer 111 may have a maximum value at the interface between the dielectric layer 111 and the first internal electrode 121 and/or the second internal electrode 122. The decrease in the average content of strontium (Sr) may mean that the average content of strontium (Sr) at a position spaced by a predetermined distance from the interface between the dielectric layer 111 and the first internal electrode 121 and/or the second internal electrode 122 is lower than that at the interface. The distance spaced by the predetermined distance may be half a distance in a third direction between the first internal electrode 121 and the adjacent second internal electrode 122, that is, half the thickness of the dielectric layer 111, and when the content of strontium (Sr) at a measurement point of the interface between the dielectric layer 111 and the first internal electrode 121 and/or the second internal electrode 122 compares with the content of strontium (Sr) in the dielectric layer 111 spaced by half the thickness of the dielectric layer 111 from the measurement point, if the content of strontium (Sr) at the interface between the internal electrode and the dielectric layer 111 is higher the content of strontium (Sr) in the dielectric layer 111 spaced by half the thickness of the dielectric layer 111 from the measurement point, it may be determined that the content of strontium (Sr) decreases as the distance from the interface between the dielectric layer 111 and the first internal electrode 121 and/or the second internal electrode 122 increases.

According to an exemplary embodiment in the present disclosure, the average content of strontium (Sr) in the first region 111a of the multilayer ceramic electronic component 100 may be greater than 0.1 mol % and/or less than 9.3 mol % with respect to a total content of the compounds included in the first region. The average content of strontium (Sr) in the first region 111a may mean an arithmetic mean of the content of strontium (Sr) in the first region 111a collected from 10 locations, and may be a value measured at 10 locations at equal intervals in the first direction from the first region 111a closest to a center of an XY cut plane passing through a center of the ceramic body 110 of the multilayer ceramic electronic component 100 according to the present disclosure. When the average content of strontium (Sr) in the first region 111a of the multilayer ceramic electronic component 100 according to the present disclosure satisfies the above range, the internal electrode having excellent connectivity and the dielectric layer 111 having excellent electrical reliability may be implemented together.

According to an exemplary embodiment in the present disclosure, the first region 111a of the dielectric layer 111 of the multilayer ceramic electronic component 100 may include a component represented by $Ba_{1-z}Sr_zTiO_3$ ($0.001 \leq z \leq 0.093$). The component may be a form in which the strontium (Sr) is combined with the barium titanate ($BaTiO_3$). Since the strontium (Sr) has an ionic radius smaller than that of barium (Ba), the strontium (Sr) is doped, and as a result, a size of individual lattice decreases and a binding force of oxygen ions increases, thereby suppressing the generation of the oxygen vacancy. In addition, since the strontium (Sr) is combined with the barium titanate ($BaTiO_3$), the diffusion coefficient of the common ceramic material itself decreases, thereby reducing the amount of the common ceramic material that is squeezed-out to the dielectric layer 111.

In one example, the dielectric layer 111 of the multilayer ceramic electronic component 100 of the present disclosure may include a third region 111c where an average content of strontium (Sr) is 0 mol %, wherein the third region is parallel to and adjacent to the second region 111b of the dielectric layer 111. The multilayer ceramic electronic component 100 according to the present disclosure may not use the strontium (Sr) in the manufacturing step of the dielectric layer 111. The strontium (Sr) contained in the dielectric layer 111 may be included in the internal electrode and may diffused into the dielectric layer 111 as described later. Even if the strontium (Sr) is diffused from the internal electrode to the dielectric layer 111, the strontium (Sr) may be intensively dissolved in the barium titanate-based component of the dielectric layer 111 in the region close to the internal electrode, and as a result, as the distance from the interface between the dielectric layer 111 and the internal electrode increases, the concentration of strontium (Sr) may decrease and the third region 111c in which the strontium (Sr) is not diffused may be present in the dielectric layer 111. The third region 111c may be a region in which strontium (Sr) is not detected. Due to the presence of the third region 111c in the dielectric layer 111, the multilayer ceramic electronic component 100 having desired electrical characteristics without being affected by the common ceramic material leaked from the internal electrode may be provided.

According to an exemplary embodiment of the present disclosure, the dielectric layer 111 of the present disclosure may include grains and grain boundaries. The dielectric layer 111 may include a plurality of grains and grain boundaries disposed between two or more grains. The grains may be classified by the grain boundaries.

In an exemplary embodiment in the present disclosure, an average particle diameter of grains included in the dielectric layer 111 of the multilayer ceramic electronic component 100 of the present disclosure may be in the range of 150 nm or more and 400 nm or less. In the present specification, the "average particle diameter" may mean an arithmetic mean of particle diameters measured at 10 locations of the XZ cut plane passing through the center of the multilayer ceramic electronic component 100. The 10 locations may be 10 locations which are divided at equal intervals in the first direction along the center of the dielectric layer 111 closest to the center of the cut plane, which may mean a D50 particle diameter. The measurement particle diameter of the grains may be calculated by an image analysis program (Image Pro Plus ver 4.5 from Media Cybernetics Co.) after capturing an image of the cut plane of the dielectric layer 111 using the scanning electron microscope (SEM, JSM-7400F from Jeol Ltd.).

As described above, the conventional multilayer ceramic electronic component 100 has a problem in that it is difficult to reduce the size of grains to a certain level or less because grains are abnormally grown due to the diffusion of the common ceramic material or the like. On the other hand, in the multilayer ceramic electronic component 100 according to the present disclosure, the first region having the highest average content of strontium (Sr) in the dielectric layer 111 may be present at a predetermined distance from the interface between the dielectric layer 111 and the internal electrode, and thus, the leakage of the common ceramic material may be minimized, thereby forming grains having a smaller average particle diameter. As a result, the fraction of the grain boundary may increase, and as a result, a potential barrier may be greatly improved and electrical properties such as insulation resistance may be improved.

According to an exemplary embodiment in the present disclosure, the dispersion of the particle diameter of grains included in the dielectric layer 111 of the multilayer ceramic electronic component 100 may be in the range of 50 nm or more and 150 nm or less. In the present specification, the "dispersion of the particle diameter of grains" may mean a standard deviation of grains of the dielectric layer 111 included in a 0.1 μm×0.1 μm region at 10 measurement locations of the average particle diameter of grains in the cross section of the multilayer ceramic electronic component 100, which is calculated based on the average particle diameter of grains described above. The dispersion of the particle diameter of grains may indicate a degree to which the distribution of the size of grains is uniform, and the smaller the size, the more uniform the grain size becomes. The multilayer ceramic electronic component 100 according to the present disclosure may adjust the dispersion of the particle diameter of grains included in the dielectric layer 111 to the range to effectively prevent the concentration of the electric field from being applied to a specific portion of the dielectric layer 111, thereby improving the reliability.

In one example, an average thickness of the dielectric layer 111 may be 0.4 μm or less. The average thickness of the dielectric layer 111 may be an arithmetic mean of values in the third direction measured at the same point as the measurement point of the average content of strontium (Sr) in the dielectric layer 111. The lower limit of the average thickness of the dielectric layer 111 is not particularly limited, but may be, for example, 0.01 μm or more.

The dielectric layer 111 may be formed by adding required additives to slurry including the material described above and applying the slurry to a carrier film and drying the slurry to prepare a plurality of ceramic sheets. The ceramic sheets may be formed by manufacturing the slurry in a sheet shape having a thickness of several micrometers by a doctor blade method, but are not limited thereto.

The ceramic body 110 may be formed by alternately stacking a ceramic green sheet in which the first internal electrode 121 is printed on the dielectric layer 111 and a ceramic green sheet in which the second internal electrode 122 is printed on the dielectric layer 111 in a third direction (Z direction). A method of printing the first and second internal electrodes 121 and 122 may be a screen printing method, a gravure printing method or the like, but is not limited thereto.

The first and second internal electrodes 121 and 122 may be stacked so that end surfaces thereof are exposed, respectively, to opposite portions of the ceramic body 110 opposing each other. Specifically, the first and second internal electrodes 121 and 122 may be exposed to both surfaces of the ceramic body 110 in the first direction (X direction), respectively, and the first internal electrode 121 may be exposed in a first surface S1 direction of the ceramic body 110 and the second internal electrode 122 may be exposed in a second surface S2 direction.

The first and second internal electrodes 121 and 122 may include a conductive metal. Examples of the conductive metal may include one or more of nickel (Ni), copper (Cu), tin (Sn), palladium (Pd), platinum (Pt), iron (Fe), gold (Au), silver (Ag), tungsten (W), titanium (Ti), lead (Pb), or alloys thereof. The first and second internal electrodes 121 and 122 may be formed using a conductive paste including the conductive metal.

According to an exemplary embodiment in the present disclosure, the first internal electrode 121 and/or the second internal electrode 122 of the multilayer ceramic electronic component 100 of the present disclosure may include at least one trap region of a common ceramic material containing strontium (Sr). The trap region may mean a region in which components of the common ceramic material added to the internal electrode in the raw material step remains without being squeezed out due to the shrinkage of the metal component of the internal electrode. When the trap region contains strontium (Sr), similar to the dielectric layer 111 described above, the connectivity of the internal electrode may be improved by reducing the diffusion coefficient of the common ceramic material, and the region in which the common ceramic material is trapped may be formed evenly.

In one example, the average content of strontium (Sr) in the first internal electrode 121 and/or in the trap region 123 of the common ceramic material included in the first internal electrode 121 of the multilayer ceramic electronic component 100 of the present disclosure may be greater than 0.5 mol % and/or less than 9.3 mol % with respect to a total content of the compounds included in the first region. The average content of strontium (Sr) in the trap region 123 of the common ceramic material may be an arithmetic mean of values measured in 10 trap regions of the common ceramic material included in the internal electrode closest to the center of the XZ cut plane passing through the center of the multilayer ceramic electronic component 100. The 10 locations may be five trap regions 123 of the common ceramic material sequentially arranged in both directions in the first direction from the center of the internal electrode closest to the center of the XZ cut plane, and the average content of strontium (Sr) may be an average of values measured at the central portion of the trap region of the common ceramic material. When the average content of strontium (Sr) in the trap region 123 of the common ceramic material of the multilayer ceramic electronic component 100 according to the present disclosure satisfies the above range, the diffusion coefficient of the common ceramic material decreases, and thus, the trap region 123 of the common ceramic material decreases evenly, thereby improving the connectivity of the internal electrodes.

In the above example, the trap region 123 of the common ceramic material of the first internal electrode 121 and/or the second internal electrode 122 of the multilayer ceramic electronic component 100 may contain a component represented by $Ba_{1-z}Sr_zTiO_3$ (0.005≤z≤0.093). The component may be a form in which strontium (Sr) is combined with barium titanate ($BaTiO_3$). Since the strontium (Sr) has an ion radius smaller than that of barium (Ba), the strontium (Sr) may be first doped during the sintering process, thereby preventing the common ceramic material from being squeezed-out to the dielectric layer 111. As a result, the excessive growth of the grains of the dielectric layer 111 due to the excessive leakage of the common ceramic material may be prevented, and the generation of the oxygen vacancy may be suppressed to further improve the reliability.

In one example of the present disclosure, the trap regions 123 of the common ceramic material included in the first internal electrode 121 and/or the second internal electrode 122 of the multilayer ceramic electronic component 100 according to the present disclosure may be discontinuously disposed in the entire of the internal electrode 121 and/or the second internal electrode 122. The fact that the trap regions 123 of the common ceramic material are disposed discontinuously may mean that any of the materials included in the trap region 123 do not penetrate through the region outside of the trap region 123 in the first internal electrode 121 and/or the second internal electrode 122. Since the trap regions 123 of the common ceramic material are discontinuously disposed in the first internal electrode 121 and/or the second internal electrode 122, the trap regions 123 of the common ceramic material may be evenly distributed, and thus the connectivity between the first internal electrode 121 and/or the second internal electrode 122 may be improved.

In one example, the average thickness of the first internal electrode 121 and/or the second internal electrode 122 may be 0.4 μm or less. The average thickness of the first internal electrode 121 and/or the second internal electrode 122 may be an arithmetic mean of values in the third direction measured at the same point as the measurement point of the average content of strontium in the trap region 123 of the common ceramic material of the first internal electrode 121 and/or the second internal electrode 122. The lower limit of the average thickness of the first internal electrode 121 and/or the second internal electrode 122 is not particularly limited, but may be, for example, 0.01 μm or more.

In the multilayer ceramic electronic component according to the present disclosure, the first external electrode 131 and the second external electrode 132 may be disposed on the outer surface of the ceramic body 110. In the multilayer ceramic electronic component 100 according to the present disclosure, the first external electrode 131 may be disposed on the first surface S1 of the ceramic body 110, and the second external electrode 132 may be disposed on the second surface S2 of the ceramic body 110.

In one example, at least a portion of the first external electrode 131 of the multilayer ceramic electronic component 100 according to the present disclosure may extend to a third surface S3, a fourth surface S4, a fifth surface S5, and a sixth surface S6 of the ceramic body 110. In addition, at least a portion of the second external electrode 132 may extend to the third surface S3, the fourth surface S4, the fifth surface S5, and the sixth surface S6 of the ceramic body 110. In this case, the first external electrode 131 and the second external electrode 132 may be disposed to be spaced apart from each other. When at least a portion of the first external electrode 131 and/or the second external electrode 132 extends to the third surface S3, the fourth surface S4, the fifth surface S5, and the sixth surface S6 of the ceramic body 110, respectively, the extending portion may serve as a so-called band part, and the reliability of the multilayer ceramic electronic component 100 according to the present disclosure may be further improved by preventing the penetration of moisture.

According to the exemplary embodiment in the present disclosure, the first external electrode 131 and the second external electrode 132 of the multilayer ceramic electronic component 100 may be a sintered electrode including a conductive metal. Examples of the conductive metal may include one or more of nickel (Ni), copper (Cu), tin (Sn), palladium (Pd), platinum (Pt), iron (Fe), gold (Au), silver (Ag), tungsten (W), titanium (Ti), lead (Pb), or alloys thereof.

In addition, the first external electrode 131 and the second external electrode 132 may include glass. The glass may be a composition in which oxides are mixed, and is not particularly limited, but it may be at least one selected from the group consisting of silicon oxide, boron oxide, aluminum oxide, transition metal oxide, alkali metal oxide, and alkaline earth metal oxide. The transition metal may be selected from the group consisting of zinc (Zn), titanium (Ti), copper (Cu), vanadium (V), manganese (Mn), iron (Fe), and nickel (Ni), the alkali metal may be selected from the group consisting of (Li), sodium (Na), and potassium (K), and the alkaline earth metal may be at least one selected from the group consisting of magnesium (Mg), calcium (Ca), strontium (Sr), and barium (Ba).

As an example of a method of forming the first external electrode 131 and the second external electrode 132, there may be a method of forming the first external electrode 131 and the second external electrode 132 by dipping the ceramic body 110 in a conductive paste containing a conductive metal and then firing the ceramic body 110, or a method of forming the first external electrode 131 and the second external electrode 132 by printing and sintering the conductive paste on the surface of the ceramic body 110 by a screen printing method, a gravure printing method, or the like. In addition, the first external electrode 131 and the second external electrode 132 may be formed by a method of forming the first external electrode 131 and the second external electrode 132 by applying the conductive paste to the surface of the ceramic body 110, a method of transferring a dried film obtained by drying the conductive paste onto the ceramic body 110 and then sintering the dried film, or the like, but the method of forming the first external electrode 131 and the second external electrode 132 is not limited thereto. For example, the first external electrode 131 and the second external electrode 132 may be formed by forming the conductive paste on the ceramic body 110 and then sintering the conductive paste by various methods other than the above methods.

According to another embodiment in the present disclosure, the first and second external electrodes 131 and 132 of the multilayer ceramic electronic component 100 may be a resin-based electrode containing a conductivity imparting agent and a base resin. The resin-based electrode may have a structure in which the conductivity imparting agent is dispersed in the base resin, and may be manufactured in a lower temperature environment than the sintered electrode, so the conductivity imparting agent may exist in the base resin in the form of particles. When the first and second external electrodes 131 and 132 are resin-based electrodes, a physical stress such as external impact may be blocked.

The conductivity imparting agent may include a conductive metal and/or a conductive polymer. Examples of the conductive metal may include one or more selected from the group consisting of calcium (Ca), titanium (Ti), molybdenum (Mo), tungsten (W), iron (Fe), cobalt (Co), nickel (Ni), palladium (Pd), platinum (Pt), copper (Cu), silver (Ag), gold (Au), zinc (Zn), aluminum (Al), tin (Sn), lead (Pb), and alloys thereof, but is not limited thereto.

In addition, non-limiting examples of the conductive polymer may include sulfur (S) and/or nitrogen (N)-containing compounds such as poly(thiophene) (PT), poly(ethylenedioxy) thiophene (PEDO), poly(p-phenylene sulfide) (PPS), polyanilines (PANI), poly(3-hexylthiophene-2,5-diyl) (P3HT), poly(4-butylphenyldiphenylamine) (Poly- TPD), poly(4-butylphenyldiphenylamine) (PSS), poly(9-vinylcarbazole) (PVK), poly(4,4'-dimethoxy bithophene) (PDBT), polyaniline, or polypyrrole, and compounds containing no heteroatom such as poly(fluorine), polyphenylene, polypyrene, polyazulene, polynaphthalene, poly(acetylene) (PAC), or poly(p-phenylene vinylene) (PPV), but are not limited thereto.

The first and second external electrodes 131 and 132 may include but not limited to carbon fillers such as carbon nanotube, graphene, and fullerene, and/or an alloy filler such as spherical, elliptical, flake, fibrous, or resinous type (dendrite type), if necessary.

The base resin included in the first and second external electrodes 131 and 132 may be, for example, a thermosetting resin. Specific examples of the thermosetting resin may include a phenol resin, a urea resin, a diallylphthalate resin, a melanin resin, a guanamine resin, an unsaturated polyester resin, a polyurethane resin, an epoxy resin, an aminoalkyd resin, a melamine-urea cocondensation resin, a silicon resin, a polysiloxane resin, and the like, but are not limited thereto. When using the thermosetting resin, a crosslinking agent, a curing agent such as a polymerization initiator, a polymerization accelerator, a solvent, a viscosity modifier, and the like may be further added and used, if necessary.

Hereinafter, the present disclosure will be described in more detail through Experimental Examples. However, they are to assist in the detailed understanding of the present disclosure, and the scope of the present disclosure is not limited by Experimental Examples.

Experimental Example

A breakdown voltage (BDV) and mean time to failure (MTTF) were measured using 0603 size (length×width×thickness: 0.6 mm×0.3 mm×0.3 mm) mass-produced chip (temperature characteristic X7R and capacity 2.2 μF) from Samsung Electro-Mechanics Co., Ltd with external electrodes formed on a lengthwise side of the ceramic body.

The chips used were prepared in the same manner, except that the content of strontium (Sr) was differently added to the common ceramic material used for the internal electrode paste, and the average value of the measured values for each of the 40 chips was used. Table 1 below was based on a chip in which strontium (Sr) is not added in the common ceramic material, and described relative values to a degree to which a measured value increases from a reference chip.

TABLE 1

| Content of Sr (mol %) | BDV | MTTF |
|---|---|---|
| 0 | 1 (Reference) | 1 (Reference) |
| 0.1 | 0.99 | 1.05 |
| 1.2 | 1.12 | 1.14 |
| 2.3 | 1.16 | 1.22 |
| 6.4 | 1.21 | 1.31 |
| 9.3 | 1.02 | 0.98 |
| 16.4 | 0.85 | 0.74 |

In the above Table 1, the break-down voltages (BDVs) were measured using a Keithley measurer, and voltage values in a moment in which a current value becomes 20 mA while applying a voltage from 0 V by 1.00000 V in a sweep manner were measured as BDV values, and were compared with the reference value. In the case of the MTTF, the evaluation was conducted under a high temperature load of 105° C. and 1.5 Vr, and the average MTTF values were compared.

Referring to Table 1, it can be seen that the MTTF increases rapidly since the content of strontium (Sr) exceeds 0.1 mol %, and it can be seen that when the content of strontium (Sr) is less than 9.3 mol %, both the breakdown voltage and MTTF tend to be superior to the reference value. When the content of strontium (Sr) is 9.3 mol % or greater, both the breakdown voltage and MTTF tend to deteriorate. For example, when the content of strontium (Sr) is 16.4 mol %, both the breakdown voltage and MTTF are significantly inferior to the reference value. As a result, it can be seen that the multilayer ceramic electronic component having excellent reliability may be provided when the content of strontium (Sr) is greater than 0.1 mol % and less than 9.3 mol %.

As set forth above, according to the exemplary embodiment in the present disclosure, the electrode connectivity of the multilayer ceramic electronic component may be improved.

The size and dispersion of grains of the multilayer ceramic electronic component may be constantly improved.

Further, the insulation resistance characteristics of the multilayer ceramic electronic component may be improved.

Further, the reliability of the multilayer ceramic electronic component may be improved.

Various and beneficial advantages and effects of the present disclosure are not limited to the contents described above, and may be more easily understood in a process of describing exemplary embodiments of the present disclosure.

While exemplary embodiments have been shown and described above, it will be apparent to those skilled in the art that modifications and variations could be made without departing from the scope of the present invention as defined by the appended claims.

What is claimed is:

1. A multilayer ceramic electronic component, comprising:
   a ceramic body including a dielectric layer containing strontium (Sr) and first and second internal electrodes alternately stacked with the dielectric layer interposed therebetween;
   a first external electrode connected to the first internal electrode; and
   a second external electrode connected to the second internal electrode,
   wherein the dielectric layer includes at least one first region parallel to and adjacent to the first internal electrode or the second internal electrode and having a thickness of 50 nm or less, and a second region parallel to and adjacent to the first region, and
   the first region has an average content of strontium (Sr) greater than 0.1 mol % and less than 9.3 mol % with respect to a total content of compounds included in the first region, and the second region has a lower average content of strontium (Sr) than the average content of the strontium of the first region.

2. The multilayer ceramic electronic component of claim 1, wherein the average content of strontium (Sr) in the dielectric layer decreases as a distance from the interface between the dielectric layer and the first and/or second internal electrodes increases.

3. The multilayer ceramic electronic component of claim 1, wherein the dielectric layer includes a third region parallel to and adjacent to the second region and having an average content of strontium (Sr) is 0 mol % with respect to a total content of compounds included in the third region.

4. The multilayer ceramic electronic component of claim 1, wherein the dielectric layer includes a grain, and an average particle diameter of the grain is 150 nm or more and/or 400 nm or less.

5. The multilayer ceramic electronic component of claim 4, wherein a diameter of the grain is 50 nm or more and/or 150 nm or less.

6. The multilayer ceramic electronic component of claim 1, wherein the first internal electrode and the second internal electrode include at least one trap region containing the strontium (Sr).

7. The multilayer ceramic electronic component of claim 6, wherein an average content of strontium (Sr) in the trap region is greater than 0.5 mol % and/or less than 30 mol % with respect to a total content of compounds included in the trap region.

8. The multilayer ceramic electronic component of claim 6, wherein the trap region is discontinuously disposed in the first internal electrode and/or the second internal electrode.

9. The multilayer ceramic electronic component of claim 1, wherein an average thickness of the dielectric layer is in a range of 0.01 μm or more and/or 0.4 μm or less.

10. The multilayer ceramic electronic component of claim 1, wherein an average thickness of the first internal electrode and/or the second internal electrode is in a range of 0.01 μm or more and/or 0.4 μm or less.

11. The multilayer ceramic electronic component of claim 6, wherein the trap region further incudes a common ceramic material which is the same materials as the materials included in the first internal electrode and the second internal electrode.

* * * * *